3,128,111
FASTENING MEANS FOR RAILWAY CAR
GRAIN DOORS
Lamont F. Andrews, 8707 William St., Omaha 24, Nebr.
Filed Apr. 12, 1962, Ser. No. 187,060
7 Claims. (Cl. 292—52)

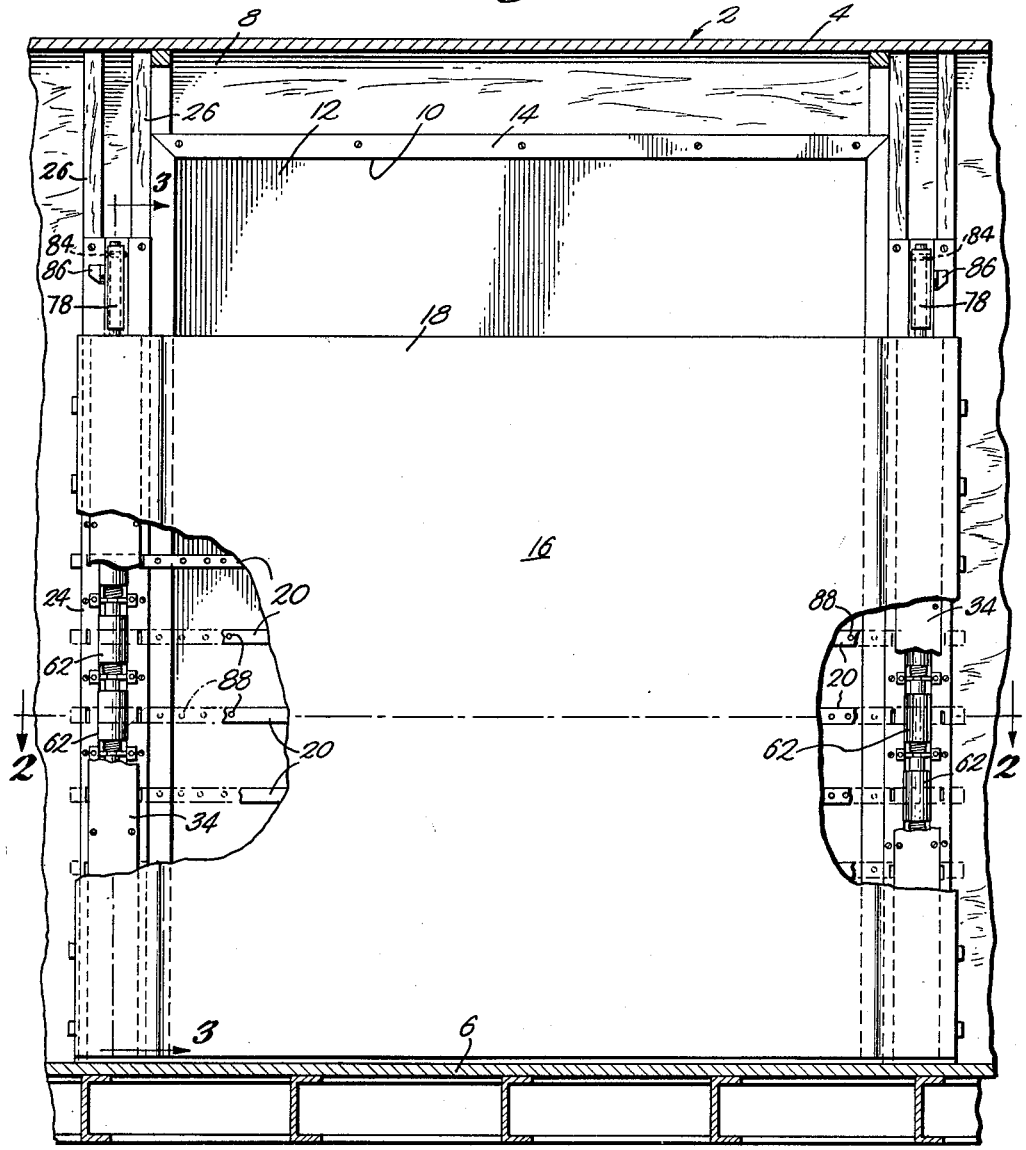

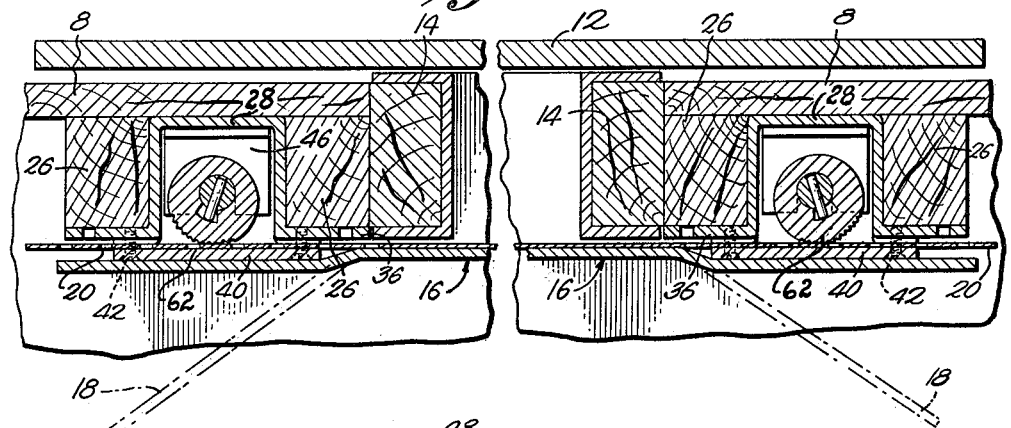
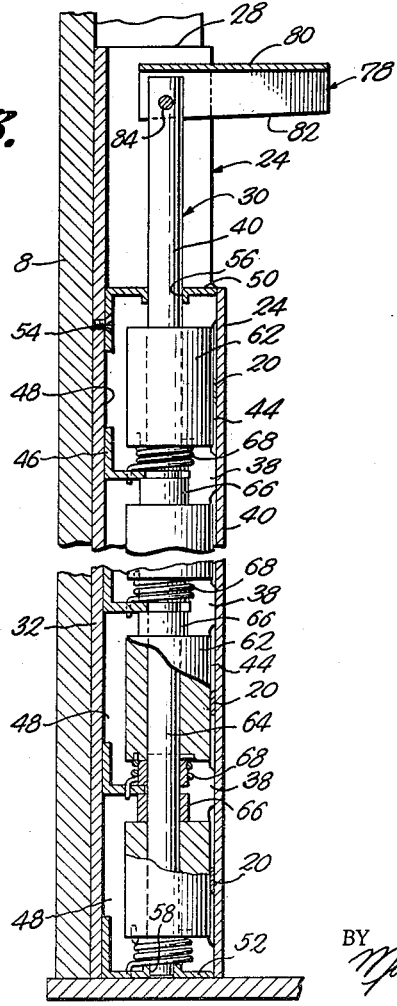
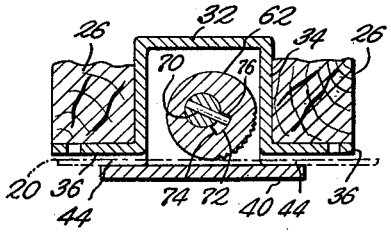

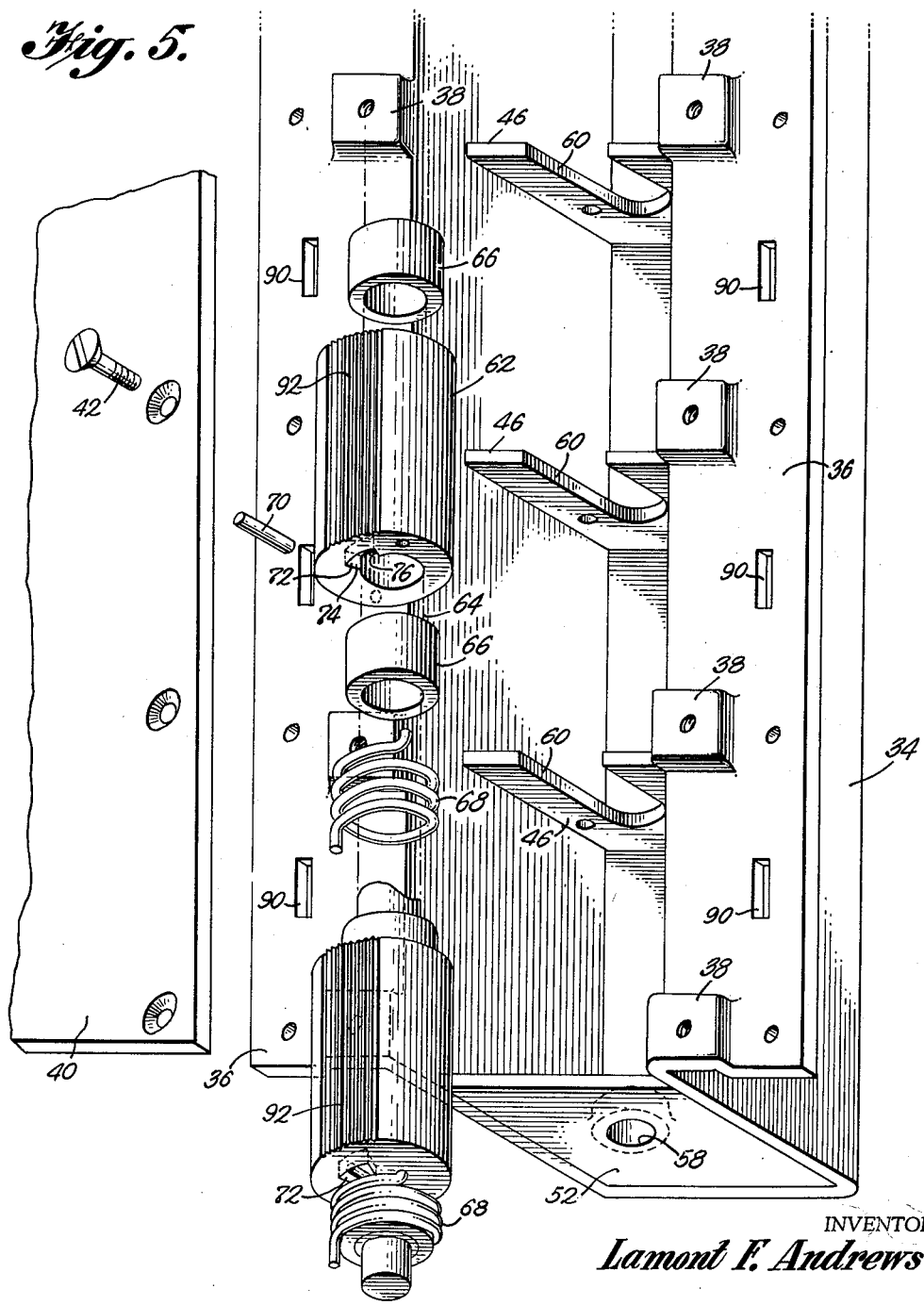

This invention relates to doors for conventional railroad box cars, and more particularly to means for fastening disposable grain doors across the side openings in box cars.

In the railroad industry, conventional box cars have been used extensively for the transportation of grain and other like granular commodities. However, as will be readily appreciated, the standard side wall openings in box cars are provided with sliding door arrangements which are not readily adapted to receive and retain such granular materials without further modification to the box car body. Accordingly, there has been developed in the art, disposable type grain doors which may be installed from the interior of the car to the frame members of the side openings, and which provide a lateral support for the loose grain, thus permitting the sliding doors to operate unobstructed. These disposable type doors generally comprise a substantially rectangular shaped, heavy sheet material having a plurality of horizontal, vertically spaced reinforcing straps consisting of steel or any other suitable material with comparable strength characteristics, having end portions which extend laterally of the side edges of the sheet. The sheet-like material has a plane surface area which covers a substantial portion of the opening with some overlapping of the side frames of the side walls of the car, except for a portion of the top of the opening which is left uncovered. Under present practice the disposable doors are secured to the side walls of the car by nailing the end portions of the horizontal reinforcing straps to the vertical side frames of the opening.

To secure such disposable grain doors across standard side car openings of box cars, the operator normally enters the box car and with the grain door in the position as described, proceeds to nail the end portions of the straps to the side frame members of the opening, using as many as thirty and forty nails to adequately secure the grain door. Upon completion of the nailing operation, the operator then leaves the car by climbing through the opening provided at the top of the grain door. The grain is then loaded into the box car through the same opening. When the grain is to be unloaded, the operator follows a procedure whereby he climbs through the top opening above the grain door and proceeds with the aid of a claw hammer to remove the nails which hold the straps to the side frames of the openings. When enough nails are removed, the force of the grain bearing against the disposable door will blow out the door.

Such a procedure as currently being followed in the industry has many disadvantages, in that much time is required to install and remove such doors. In addition, the installation and removal of the doors requires an awkward operation for the operator, which especially during the removal operation, requires him to enter the box car through the top opening and to remove the nails while the car is still loaded with grain. During this same removal operation, many of the nails removed from the side frame of the openings are lost in the grain, which further renders the present procedures and methods of fastening such grain doors to the side openings of box cars, very undesirable. Furthermore, considerable damage to the box car is incurred in the repeated nailing of the end portions of the horizontal steel straps to the side frame members of the side openings.

It is, therefore, the general object of this invention to provide an improved means for fastening disposable grain doors across the side openings of conventional railroad box cars.

Another object of this invention is to provide an improved means for fastening disposable grain doors across the side openings of conventional railroad box cars which does not require the use of any tools.

A further object of this invention is to provide an improved means of fastening disposable grain doors having horizontal, vertically spaced reinforcing straps across a side opening in a conventional railroad box car which will permit the repeated installation and removal of such doors without damage to the interior of the car.

A still further object of this invention is to provide a means for fastening disposable grain doors across a side opening in a conventional railroad box car, which will permit obtaining a maximum tautness of each individual strap independently and which will further permit the release of the tension force on all the straps simultaneously.

A still further object of this invention is to provide a means for fastening disposable grain doors across a side opening, in a conventional railroad box car which will provide for faster installation and removal of the grain door.

Another object of this invention is to provide a means for fastening disposable grain doors across a side opening in conventional railroad box cars which can be readily installed in existing box car constructions with minimum modification of the car body.

A still further object of this invention is to provide a means for fastening disposable grain doors across a side opening in a conventional railroad box car which will provide a sufficient holding force on the straps to prevent the rupture of the grain door while in transit.

Further objects and advantages of the invention will become apparent as the following description proceeds when taken in conjunction with the drawings which accompany and form a part of this specification.

For a better understanding of this invention, reference may be had to the accompanying drawings in which:

FIGURE 1 is a partial side elevation view of a conventional railroad box car from the interior illustrating a grain door disposed across the usual side opening and secured to the side wall by means of the present invention;

FIGURE 2 is an enlarged cross-sectional view taken along lines 2—2 of FIGURE 1, with the center portion broken away, showing the invention in the operative position;

FIGURE 3 is an enlarged cross-sectional view of the invention taken along line 3—3 of FIGURE 1, with the center portion thereof broken away;

FIGURE 4 is a cross-sectional view of the invention similar to the righthand portion of FIGURE 2, showing the invention in the inoperative position;

FIGURE 5 is an exploded view of the operating mechanism of the present invention.

Briefly stated, the invention is concerned with grain door fastening devices of the type adapted to be mounted in railroad box cars at the sides of the car door openings to grip the end portions of the reinforcing straps of disposable grain doors to hold the doors stretched taut across the doorway. The fastening devices include housings through which the door strap ends are threaded, and which enclose self adjusting means for wedgingly gripping the end portions of the straps independently and releasing them simultaneously.

Referring to FIGURE 1 of the drawings, there is shown a portion of a railroad box car 2 having a top 4, a floor 6 and a side wall 8. The usual door opening 10 is provided in the side wall 8, and a conventional door 12 is mounted for sliding movement across the opening. The door opening has a surrounding frame 14.

When the railroad box car is to be used to transport grain or other like granular materials, a disposable door 16 is arranged across the doorway. This may be a door of the type shown in U.S. Patent No. 2,599,443 to B. H. Ford, et al., issued June 3, 1952, and includes a rectangular sheet of suitable disposable material 18 reinforced by a plurality of horizontally extending, vertically spaced straps 20. The door 16 is of less height than the door opening, so that workmen may leave or enter the car over the top of the grain door.

The door fasteners with which the present invention is primarily concerned, are indicated generally at 24, and are used in pairs with one fastener on each side of the door opening. If suitable studding is located at the side of the door opening the fastener may be secured to it; if not, furring strips 26 can be attached to the car side wall to mount the door fasteners.

Each fastener includes a housing 28 and a strap gripping mechanism 30. The housing is channel shaped in horizontal cross-section, having a back wall 32 and side webs 34. Flanges 36 extend outwardly from the front edges of the side webs 34 and lie in a common vertical plane substantially parallel to the back wall 32. When the fastener is mounted in the furring strips 26, flanges 36 will lie substantially in the plane of the inner face of the car doorway frame. Each flange 36 has a plurality of relatively shallow bosses 38 projecting from its face with the bosses being spaced equidistant along the flange 36. The bosses 38 form supports to seat a housing cover plate 40 which extends over the major portion of the channel opening. Screws 42 through the cover plate and bosses hold the cover in place. As the cover rests upon the bosses, there are provided, intermediate successive bosses, slots 44 on either side of the housing. The bosses on the two flanges are horizontally aligned so that the slots 44 are aligned to allow threading of the end portions of straps 20 through the housing. The number of bosses formed on the housing flanges and their spacing and location is such that the intervening slots 44 will be equal in number to the straps of the grain door and properly spaced to receive them therethrough.

Within the housing, there are a number of spacer partitions 46 which are secured to the back wall 32, with each partition being located in horizontal alignment with a pair of horizontally aligned bosses 38. Thus, the housing will be divided into a number of compartments 48 with pairs of horizontally aligned slots 44 forming inlets and outlets to the respective compartments. It will be clear that an end portion of a strap 20 threaded through two aligned slots 44 will traverse one of the compartments 48 and extend across the inner face of the cover plate. The top compartment is closed at the top by a bearing bracket 50, while the bottom compartment is closed at the bottom by a bearing bracket 52. Bracket 52 may be welded or otherwise permanently fastened in place. However, bracket 50 is secured to the housing back wall 32 by screws 54. Bracket 50 has a bearing opening 56 and bracket 52 has a bearing opening 58. It will be noted that the partitions 46 do not extend to the front edge of the housing, and each has a slot 60 opening into its front edge and extending toward the back of the housing. The arcuate bottoms of slots 60 and the bearing openings 56 and 58 are in vertical axial alignment.

Eccentric grippers 62 are located in each compartment of the housing with all of the grippers being carried by a control shaft 64 which extends through the bearing openings 56 and 58 in brackets 50 and 52 and seats in the bottoms of the slots 60 in the housing partitions. The control shaft 64 is rotatable in the bearing brackets, while the grippers 62 are mounted for limited rotation relative to the shaft, as will be described. Each gripper 62 is positioned centrally of its compartment by collars 66, which may project from opposite ends of the grippers 62 as integral parts thereof, or as shown, may be separate members. A coil spring 68 surrounds one collar of each gripper, and has its ends anchored in the gripper and the adjacent partition to yieldingly bias the grippers in a predetermined direction. The bias will be clockwise or counterclockwise, depending upon whether the fastener is to be used at the right or left side of the car door opening. Of course, the bias will be in the same direction for all the grippers 62 of the same fastener device.

The grippers 62 can be of any cross-sectional configuration which when mounted on the control shaft 64 and rotated in the direction of the side opening will engage the cover plate 40 to provide a jamming or wedging action therewith. It is preferred although not limited thereto that eccentrically mounted, cylindrically shaped grippers be used as illustrated in the drawings.

As stated, the independent grippers 62 of each unit have limited angular movement relative to the shaft on which they are mounted. This is accomplished by inserting a drive pin 70 rigidly in the control shaft 64 at each gripper position. The pins 70 have projecting ends which extend radially and seat in arcuate recesses 72 formed in the gripper ends, as best shown in FIGURE 5. The angularly spaced side walls 74 and 76 of the arcuate recess 72 serve as engageable abutments for the drive pin 70, defining predetermined angularly displaced limits of rotation of each gripper 62 relative to the control shaft 64.

Each of the control shafts 64 is provided with a channel shaped handle 78 having a bottom wall 80 and side web portions 82. The handles are pivotally secured to the control shaft 64 by pins 84, which pass through aligned slots in the control shaft and the web portions of the handles. The handles 78 are adapted to be pivoted in a vertical plane passing through the center of the control shaft so that the handles 78 can be pivoted up to an extended position and also down to a collapsed or closed position within the housing 24.

To assemble the fastener, the various components of the strap gripping mechanism 30, including the grippers 62, the collars 66, and the coil springs 68 are mounted loosely on the control shaft 64. The drive pins 70 in the control shaft 64 can be used for temporarily spacing and supporting the grippers 62 during the assembly operation. With the various components mounted on the control shaft 64, the strap gripping mechanism 30 is then placed into the channel opening so that the bottom portion of the control shaft 64 is inserted in the bearing opening 58 in the bottom bearing bracket 52 and each gripper is centered between successive partitions in each compartment 48. The end portions of the coil springs 68 are inserted in suitable openings in each corresponding gripper 62 and the next adjacent partition, so that the gripper 62 will be biased to rotate in the direction of the side opening. The top bearing bracket 50 is then mounted on the control shaft 64 and secured to the bottom wall 32 by means of a screw 54. The handle 78 is then pivotally secured to the control shaft 64 by means of a horizontal pin 84.

With the strap gripping mechanism 30 thus installed in the channel opening, the control shaft 64 is then rotated by means of the handle 78 in a direction which would correspond to a direction away from the side opening, so that the pins 70 engage the outwardly disposed wall of the recesses 72 relative to the side opening to rotate the grippers 62 simultaneously against the action of their associated coil spring 68 into an inoperative position, as shown in FIGURE 4. Gripping mechanism 30 can then be locked in this inoperative position by latching the outwardly disposed web portion 82 of the handle 78 on a struck-out member 86, having an appropriate recess therein for receiving a web portion 82. The struck-out members 86 are disposed on the outwardly disposed flange portions 36 of each channel member relative to the side opening of the box car. With the grippers 62 in inoperative positions, the housing cover plate 40 is seated on the bosses 38 over the channel opening and secured to the flange portions 38 by means of screws 42. The assembled fastener is then ready to be installed in the box car.

To install the disposable grain door 16, the workman positions the grain door 16 across the opening 10, as shown in FIGURE 1 from the interior of the car. The end portions of the reinforcing steel straps 20 are then threaded through the slots 44 so that each end portion of each strap 20 passes through a separate compartment 48 along the inner face of the housing cover plate 40. With the straps threaded through each compartment, the handles 78 are then released and each of the grippers 62 is caused to rotate under the action of its associated spring 68 in a direction towards the side opening 10 to jam the end portion of each reinforcing steel strap 20 against the inner face of the housing cover plate 40. Thus, it will be appreciated that the jamming action of each gripper 62 will prevent the reinforcing straps 20 from moving inwardly relative to the side opening 10.

To place additional tension on each of the reinforcing steel straps 20 there is provided in each strap a series of longitudinally spaced openings 88 which are adapted to register with elongated openings 90 provided in the flanges 38 so that a drift pin may be inserted therethrough, and by utilizing the inner side walls of the elongated openings 90 as a fulcrum, the straps 20 may be forced outwardly relative to the side opening 10. As additional tension is taken on the steel straps 20, as described, the grippers 62 are permitted to be rotated independently of the control shaft 62 by means of the lost motion of each gripper 62 relative to the control shaft 62, as provided by the arcuate recesses 72. Thus, it will be appreciated that tension can be taken on any individual strap independently of the others. Each strap 20 can be stretched taut with the use of the drift pin, and the inward travel of the straps is prevented by the jamming action of the grippers 62. To provide a more effective wedging or jamming action by the grippers 62, each gripper 62 may be provided along its gripping surface with a suitable friction contour, as indicated generally at 92. Upon completion of the installation of the grain door, the workman then leaves the box car by climbing through the opening provided above the door 16.

To remove the disposable grain doors 16 when the grain is to be unloaded, the control shaft 64 is simply rotated in a direction away from the side opening 10 by the handle 78, so that the pins 70 engage side walls of the arcuate recesses 72 and rotate all the grippers 62 simultaneously out of engagement with the end portions of the steel straps 20. The pressure provided by the grain in the box car is then sufficient to blow out the door.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. A fastener for use in a railway car having a doorway, to secure across the doorway a grain door having a plurality of horizontally extending, vertically spaced straps comprising housing means having openings for receiving the end portions of the straps therethrough, a plurality of gripping means disposed in the housing means, each gripping means disposed adjacent to and for cooperating with the end portion of a strap extending into the housing means through the openings, means disposed in the housing means for yieldingly biasing the gripping means into wedging engagement with the end portions of the straps against an interior wall of the housing means to permit movement of the straps only in a direction outwardly relative to the doorway and means for simultaneously retracting the gripping means against the action of the biasing means out of engagement with the straps.

2. A fastener for use on a railway car having a doorway, to secure across the doorway a grain door having a plurality of horizontally extending, vertically spaced straps comprising housing means having openings for receiving the end portions of the straps therethrough, a plurality of gripping means disposed in the housing means, each gripping means disposed adjacent to and for cooperating with the end portion of a strap extending into the housing means through the openings, means disposed in the housing means for yieldingly biasing the gripper means into wedging engagement with the end portions of the straps against an interior wall of the housing means to permit movement of the straps only in a direction outwardly relative to the doorway, means for simultaneously retracting the gripping means against the action of the biasing means out of engagement with the straps and means for retaining the gripping means out of engagement with the straps.

3. A fastener for use on a railway car having a doorway, to secure across the doorway a grain door having a plurality of horizontally extending, vertically spaced straps comprising, a housing having means forming a strap bearing surface, the housing having strap inlets adjacent the strap bearing surface to allow insertion of the grain door straps therethrough to overlie the strap bearing surface, a plurality of grippers mounted within the housing for wedging engagement with the straps overlying the strap bearing surface, the grippers conforming in number and spacing with the straps of the grain door with which the fastener is to be used, each gripper being mounted for limited independent movement to and from the strap wedging position, individual means to yieldingly bias each gripper toward the strap bearing surface, and means to engage all of the grippers simultaneously to move them from the strap wedging position.

4. A fastener for use on a railway car having a doorway, to secure across the doorway a grain door having a plurality of horizontally extending vertically spaced straps comprising housing means having openings for receiving the end portions of the straps therethrough, a plurality of grippers mounted within the housing, the grippers conforming in number and spacing with the straps of the grain door with which the fastener is to be used, individual means to yieldingly bias each gripper into engagement with an end portion of a strap to wedge the strap against an interior surface of the housing, operative means to engage all of the grippers simultaneously to move them from the strap wedging position and means for connecting each gripper to the operative means to provide a predetermined amount of lost motion therebetween.

5. A fastener for use on a railway car having a doorway, to secure across the doorway a grain door having a plurality of horizontally extending, vertically spaced straps comprising, a housing means having openings for receiving the end portions of the straps therethrough so that the straps overlie an interior surface of the housing means, a control shaft journaled in the housing means, a plurality of gripping means mounted on the control shaft, adjacent to and for cooperating with the end portions of the straps, the grippers conforming in number and spacing with the straps of the grain door with which the fastener is used, a plurality of drive pins disposed in the shaft and extending radially into arcuate recesses provided in each gripper, each arcuate recess having angularly spaced abutments defining predetermined limits of rotation of the grippers relative to the shaft, and individual means for yieldingly biasing each gripper into engagement with an end portion of a strap to wedge the strap against the interior surface of the housing.

6. In a railroad box car having openings in the side walls and disposable grain doors having horizontally extending, vertically spaced reinforcing straps bridging the side openings, a fastener for securing the straps of the grain doors comprising a channel member having outwardly extending flange portions lying substantially parallel to the bottom wall of the channel member, a cover plate positioned over the channel opening and secured to the flange portions of the channel member in spaced relation thereto, the spacing of the cover plate relative to the flange portions of the channel member being sufficient for receiving the end portions of the straps threaded therethrough, top and bottom bearing brackets disposed in the channel member, each bearing bracket having a bearing opening, a plurality of vertically spaced partitions disposed in each channel member and equally spaced between the top and bottom bearing brackets to define a plurality of compartments conforming in number and spacing with the straps of the grain door, each of the partitions having a recess with an arcuate bottom, each of the recesses being in vertical axial alignment with the bearing openings in the top and bottom brackets, a control shaft disposed in the channel member and journaled in the bearing openings in the top and bottom bearing brackets, grippers disposed in each compartment and mounted on the control shaft, a plurality of drive pins rigidly fixed on the control shaft and extending radially into arcuate recesses provided in each gripper, each arcuate recess having angularly spaced abutments defining predetermined limits of rotation of the grippers relative to the shaft, means disposed in each compartment for yieldingly biasing the gripping means in a direction toward the side opening into an operative position in wedging engagement with the inner face of the cover plate, means for retracting the grippers simultaneously into an inoperative position, and means for retaining the grippers in the inoperative position.

7. In a railroad box car having openings in the side walls and disposable grain doors having horizontally extending, vertically spaced reinforcing straps bridging the side openings, a fastener for securing the straps of the grain doors comprising a channel member having outwardly extending flange portions lying substantially parallel to the bottom wall of the channel member, a cover plate positioned over the channel opening secured to the flange portions of the channel member in spaced relation thereto, the spacing of the cover plate relative to the flange portions of the channel member being sufficient for receiving the end portions of the straps threaded therethrough, the flange portions of the channel members having a plurality of vertically spaced, horizontally aligned slots conforming in number and spacing with the straps of the grain door with which the fastener is used, each slot being adapted to register with a plurality of longitudinally spaced openings in the strap, top and bottom bearing brackets disposed in the channel member, each bearing bracket having a bearing opening, a plurality of vertically spaced partitions disposed in each channel member and equally spaced between the top and bottom bearing brackets to define a plurality of compartments conforming in number and spacing with the straps of the grain door, each of the partitions having a recess with an arcuate bottom, each of the recesses being in vertical axial alignment with the bearing openings in the top and bottom brackets, a control shaft disposed in the channel member and journaled in the bearing openings in the top and bottom bearing brackets, grippers disposed in each compartment and mounted on the control shaft, a plurality of drive pins rigidly fixed on the control shaft and extending radially into arcuate recesses provided in each gripper, each arcuate recess having angularly spaced abutments defining predetermined limits of rotation of the grippers relative to the shaft, means disposed in each compartment for yieldingly biasing the gripping means in a direction toward the side opening into an operative position in wedging engagement with the inner face of the cover plate, means for retracting the grippers simultaneously into an inoperative position, and means for retaining the grippers in the inoperative position.

References Cited in the file of this patent

UNITED STATES PATENTS

| | | |
|---|---|---|
| 302,389 | Ferdinand | July 22, 1884 |
| 881,041 | Almstead | Mar. 3, 1908 |
| 2,916,786 | Legat | Dec. 15, 1959 |
| 3,029,869 | Willoughby | Apr. 17, 1962 |